United States Patent
Li et al.

(10) Patent No.: US 11,073,132 B2
(45) Date of Patent: Jul. 27, 2021

(54) DYNAMIC MATCHING METHOD AND SYSTEM FOR IMPROVING WIND POWER GENERATION EFFICIENCY AT MEDIUM AND LOW WIND SPEEDS

(71) Applicants: Yingtang Li, Lanzhou (CN); Lanzhou University of Technology, Lanzhou (CN)

(72) Inventors: Yingtang Li, Lanzhou (CN); Ningning Zhu, Lanzhou (CN); Yingyong Li, Lanzhou (CN); Xiaojian Zhou, Lanzhou (CN); Penggao Chen, Lanzhou (CN); Bin Song, Lanzhou (CN)

(73) Assignee: Ying Tang Li, Lanzhou (CN)

( * ) Notice: Subject to any disclaimer, the term of this patent is extended or adjusted under 35 U.S.C. 154(b) by 3 days.

(21) Appl. No.: 16/672,762

(22) Filed: Nov. 4, 2019

(65) Prior Publication Data

US 2020/0309090 A1 Oct. 1, 2020

(30) Foreign Application Priority Data

Mar. 28, 2019 (CN) .......................... 201910242268.9

(51) Int. Cl.
*F03D 9/00* (2016.01)
*H02P 9/04* (2006.01)
(Continued)

(52) U.S. Cl.
CPC ......... *F03D 7/0276* (2013.01); *F03D 7/0272* (2013.01); *F03D 7/042* (2013.01); *F03D 17/00* (2016.05)

(58) Field of Classification Search
CPC ...... F03D 7/0272; F03D 7/0276; F03D 7/042; F03D 17/00
See application file for complete search history.

(56) References Cited

U.S. PATENT DOCUMENTS

| 2,547,636 | A | * | 4/1951 | Fumagalli | ................. | F03D 9/11 |
| | | | | | | 290/44 |
| 4,461,957 | A | * | 7/1984 | Jallen | ...................... | F03D 9/255 |
| | | | | | | 290/44 |

(Continued)

*Primary Examiner* — Tulsidas C Patel
*Assistant Examiner* — Thomas K Quigley
(74) *Attorney, Agent, or Firm* — Ying Tang Li

(57) ABSTRACT

Disclosed is a dynamic matching method for improving wind power generation efficiency at medium and low wind speeds. The method includes: acquiring dynamic matching parameters at medium and low wind speeds; storing the acquired dynamic matching parameters; performing real-time wind speed measurement to obtain real-time wind speed; determining the value relationship between the real-time wind speed and the preset dynamic matching wind speed to obtain a determining result; and according to the determining result, acquiring the dynamic matching parameters; achieving a mechanical energy-accumulating speed-increasing state according to the dynamic matching parameters; converting to a mechanical energy-releasing electrical power-generating state after the rotational speed of the wind turbine is increased to be the sum of the rotational speed with maximum wind energy capture and the increment of the rotational speed; and completing the dynamic matching when the rotation speed is reduced to the rotational speed with maximum wind energy capture.

7 Claims, 5 Drawing Sheets

(51) Int. Cl.
  *F03D 7/02*   (2006.01)
  *F03D 17/00*  (2016.01)
  *F03D 7/04*   (2006.01)

(56) References Cited

U.S. PATENT DOCUMENTS

2009/0206607 A1* 8/2009 Nakamura ............ F03D 7/0244
                                                290/44
2009/0292397 A1* 11/2009 Bjerge ................ F03D 7/0272
                                                700/280
2010/0241280 A1* 9/2010 Garcia Barace ...... F03D 7/0224
                                                700/287
2010/0260603 A1* 10/2010 Dawson ............... F03D 7/0236
                                                416/87

* cited by examiner

DYNAMIC MATCHING METHOD AND SYSTEM FOR IMPROVING WIND POWER GENERATION EFFICIENCY AT MEDIUM AND LOW WIND SPEEDS

This application claims priority to Chinese application number 201910242268.9, filed Mar. 28, 2019, with a title of DYNAMIC MATCHING METHOD AND SYSTEM FOR IMPROVING WIND POWER GENERATION EFFICIENCY AT MEDIUM AND LOW WIND SPEEDS. The above-mentioned patent application is incorporated herein by reference in its entirety.

TECHNICAL FIELD

The present invention relates to the field of wind power generation, and in particular, to a dynamic matching method and system for improving wind power generation efficiency at medium and low wind speeds.

BACKGROUND

Full exploitation of wind energy under medium and low speeds is a research hot spot in the field of current wind power generation, because these resources are distributed in a wider region and in more time periods, and longer working time period of the wind power generation. However, current wind power system has relatively low efficiency when it is operating at the medium and low wind speeds in the current wind power technology, which becomes a significant restriction to development and utilization of the medium and low speed wind energy resources.

The current wind power system generally adopts the maximum power point tracking (MPPT) technology to achieve maximum wind energy capture under the medium and low wind speeds conditions, but the energy conversion efficiency of the generator is low under the medium and low wind speeds conditions, so the overall electric energy conversion efficiency of the wind power system at the medium and low wind speeds is seriously low.

Therefore, a problem needing to be solved in the field is how to improve the wind power generation efficiency at the medium and low wind speeds.

SUMMARY

An objective of the present invention is to provide a dynamic matching method and system for improving wind power generation efficiency at medium and low wind speeds, which improves the wind power generation efficiency at the medium and low wind speeds.

To achieve the above purpose, the present invention provides the following technical solutions.

In one aspect, the present invention provides a dynamic matching method for improving wind power generation efficiency at medium and low wind speeds, where the method includes:

acquiring dynamic matching parameters at medium and low wind speeds, and storing the dynamic matching parameters at the medium and low wind speeds in a controller of a wind power generation system, where the dynamic matching parameters at the medium and low wind speeds include a rotational speed of a wind turbine with a maximum wind energy capture, an increment of the rotational speed of the wind turbine, an amplitude value of a generator output power, a curve parameter of a mechanical energy-releasing electrical power-generating curve, and a section parameter of a preset dynamic matching wind speed;

performing real-time wind speed measurement to obtain a real-time wind speed;

determining the value relationship between the real-time wind speed and the preset dynamic matching wind speed to obtain a determining result;

if the determining result represents that the real-time wind speed is lower than the preset dynamic matching wind speed, delaying a fixed time interval, and performing real-time wind speed measurement again;

if the determining result represents that the real-time wind speed is beyond an MPPT operating section, operating with constant power output, changing a blade pitch angle of the wind turbine, delaying the fixed time interval, and performing real-time wind speed measurement again;

if the determining result represents that the real-time wind speed is greater than the preset dynamic matching wind speed but is still within the MPPT operating section, setting the increment of the rotational speed of the wind turbine to zero;

acquiring a nominal wind speed which is acquired from the controller and has a first threshold difference from the real-time wind speed, and reading dynamic matching parameters at the nominal wind speed from the controller;

achieving a mechanical energy-accumulating speed-increasing state of the wind turbine according to the dynamic matching parameters at the nominal wind speed;

converting to a mechanical energy-releasing electrical power-generating state after the rotational speed of the wind turbine is increased to be the sum of the rotational speed of the wind turbine with the maximum wind energy capture and the increment of the rotational speed of the wind turbine; and when the rotational speed of the wind turbine is reduced to the rotational speed of the wind turbine with maximum wind energy capture, completing the current dynamic matching procedure, performing real-time wind speed measurement again to perform the next dynamic matching.

Optionally, the section parameter of the preset dynamic matching wind speed specifically includes a section of the wind speed in a value range of 3 m/s to 8 m/s.

Optionally, the changing a blade pitch angle of the wind turbine specifically is: increasing the blade pitch angle to a second threshold when the real-time wind speed is increased relative to a preset wind speed, and reducing the blade pitch angle to a third threshold when the real-time wind speed is reduced relative to the preset wind speed.

Optionally, the value of the preset wind speed is 14 m/s.

Optionally, the medium and low wind speeds specifically include 3 m/s, 4 m/s, 5 m/s, 6 m/s, 7 m/s and wind speed less than 8 m/s.

Optionally, the mechanical energy-releasing electrical power-generating curve is specifically represented as follows:

$P=(a_n*\omega^n+a_{n-1}*\omega^{n-1}+ \ldots a_1*\omega+a_0)+h$, where $a_n$ is a constant, $n \geq 1$, $\omega$ is the rotational speed of the wind turbine, h is the amplitude value of the generator output power, and P is a value of the generator output power.

In another aspect, the present invention provides a dynamic matching system for improving wind power generation efficiency at medium and low wind speeds, where the system includes:

a module for acquiring dynamic matching parameters at medium and low wind speeds, which is used for acquiring dynamic matching parameters at medium and low wind speeds and storing the dynamic matching parameters at the medium and low wind speeds in a controller of a wind power generation system, where the dynamic matching parameters at the medium and low wind speeds include a rotational speed of the wind turbine with a maximum wind energy capture, an increment of the rotational speed of the wind turbine, an amplitude value of a generator output power, a curve parameter of a mechanical energy-releasing electrical power-generating curve, and a section parameter of a preset dynamic matching wind speed;

a wind speed measuring module, which is used for performing real-time wind speed measurement to obtain a real-time wind speed;

a determining module, which is connected to the wind speed measuring module and is used for determining the value relationship between the real-time wind speed and the preset dynamic matching wind speed to obtain a determining result; where the wind speed measuring module is further used for performing real-time wind speed measurement again if the determining result represents that the real-time wind speed is lower than the preset dynamic matching wind speed;

an adjustment module, which is connected to the determining module and the wind speed measuring module and is used for: if the determining result represents that the real-time wind speed is beyond an MPPT operating section, operating with constant power output and changing a blade pitch angle of the wind turbine; and if the determining result represents that the real-time wind speed is greater than the preset dynamic matching wind speed but is still within the MPPT operating section, setting the increment of the rotational speed of the wind turbine to zero; where the wind speed measuring module is further used for performing real-time wind speed measurement again after the adjustment module changes the blade pitch angle of the wind turbine;

a module for acquiring dynamic matching parameters at a nominal wind speed, which is connected to the adjustment module and is used for acquiring a nominal wind speed which is acquired from the controller and has a first threshold difference from the real-time wind speed, and reading dynamic matching parameters at the nominal wind speed from the controller;

a mechanical energy-accumulating speed-increasing state determining module, which is used for determining a mechanical energy-accumulating speed-increasing state of the wind turbine according to the dynamic matching parameters at the nominal wind speed; and a mechanical energy-releasing electrical power-generating state converting module, which is connected to the wind speed measuring module and is used for converting to a mechanical energy-releasing electrical power-generating state till the dynamic matching is completed after the rotational speed of the wind turbine is increased to be the sum of the rotational speed of the wind turbine with the maximum wind energy capture and the increment of the rotational speed of the wind turbine; where the wind speed measuring module is further used for performing real-time wind speed measurement again after the dynamic matching is completed, and the dynamic matching is completed when the rotation speed of the wind turbine is reduced to the rotational speed of the wind turbine with maximum wind energy capture.

According to specific embodiments provided in the present invention, the present invention discloses the following technical effects:

the method of the present invention increases wind energy from a low rotational speed to a high rotational speed and then releases the wind energy by utilizing accumulation and release of rotation energy of a wind turbine, thereby largely improving the wind power generation efficiency. From a wind power generation system matching perspective, "Peak-Valley match" is improved to "Peak-Peak match", thereby achieving improvement of the overall wind power generation efficiency.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a dynamic matching method and system for improving wind power generation efficiency at medium and low wind speeds, which improves the wind power generation efficiency at the medium and low wind speeds.

To make the foregoing objective, features, and advantages of the present invention clearer and more comprehensible, the present invention is further described in detail below with reference to the accompanying drawings and specific embodiments.

Figure 1:
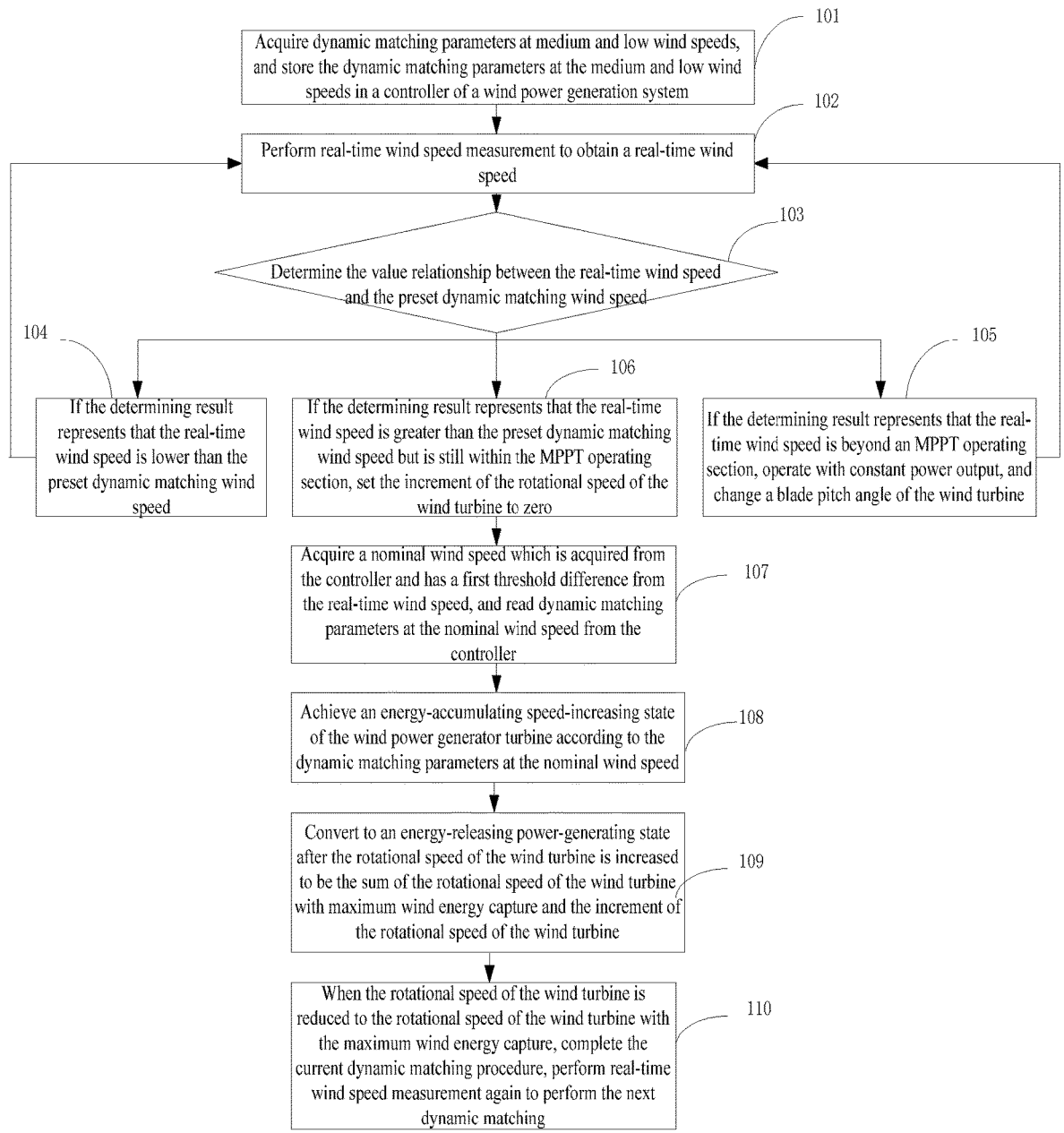
FIG. 1 is a flowchart of a dynamic matching method for improving wind power generation efficiency at medium and low wind speeds according to an embodiment of the present invention.
Figure 2:
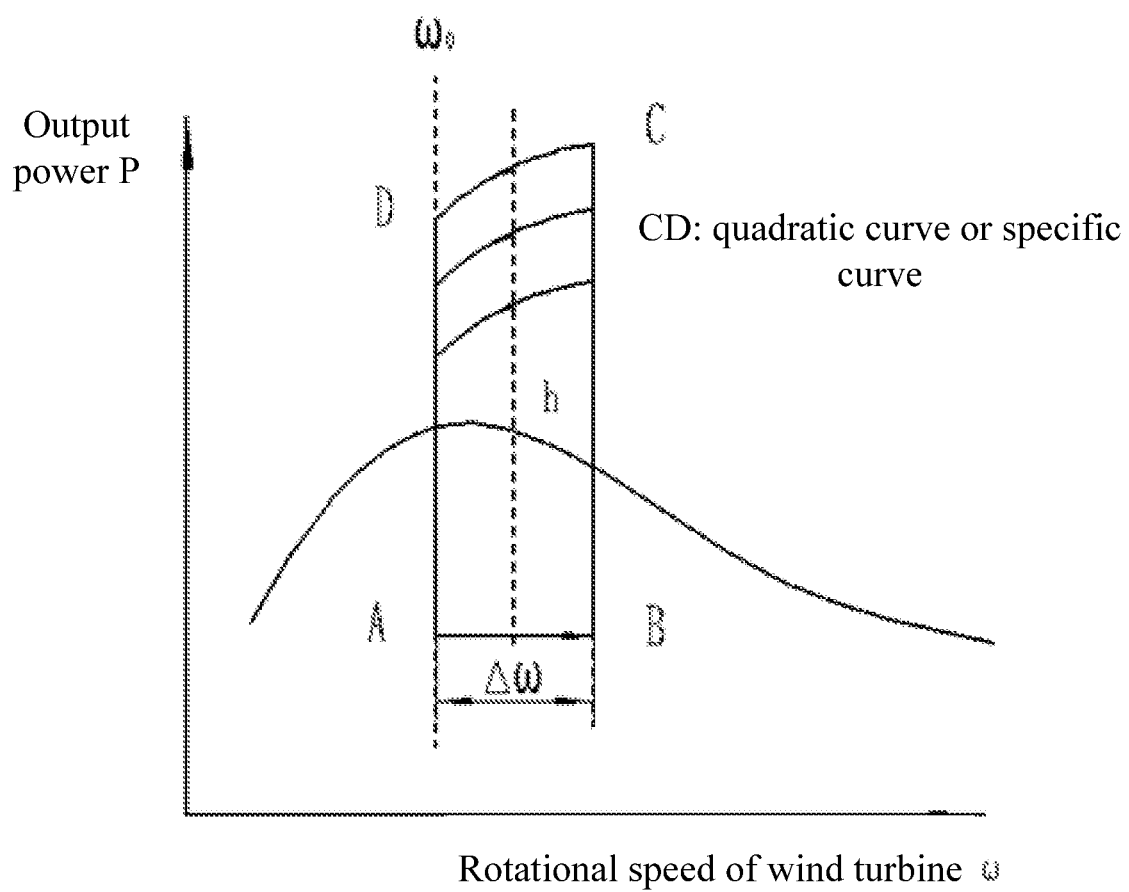
FIG. 2 is a schematic diagram of a mechanical energy-accumulating speed-increasing curve and a mechanical energy-releasing electrical power-generating curve of a wind turbine according to an embodiment of the present invention.

FIG. 1 is a flowchart of a dynamic matching method for improving wind power generation efficiency at medium and low wind speeds according to an embodiment of the present invention, and FIG. 2 is a schematic diagram of a mechanical energy-accumulating speed-increasing curve and a mechanical energy-releasing electrical power-generating curve of a wind turbine according to an embodiment of the present invention. As shown in FIG. 1 and FIG. 2, the present invention provides a dynamic matching method for improving wind power generation efficiency at medium and low wind speeds, where the method includes:

Step 101: acquire dynamic matching parameters at medium and low wind speeds, and store the dynamic matching parameters at the medium and low wind speeds in a controller of a wind power generation system, where the dynamic matching parameters at the medium and low wind speeds include a rotational speed of a wind turbine with a maximum wind energy capture, an increment of the rotational speed of the wind turbine, an amplitude value of a generator output power, a curve parameter of a mechanical energy-releasing electrical power-generating curve, and a section parameter of a preset dynamic matching wind speed;

where as shown in FIG. 2, $\omega_0$ in FIG. 2 is the rotational speed of the wind turbine with the maximum output power, $\Delta\omega$ in FIG. 2 is the increment of the rotational speed of the wind turbine, $\omega_0+\Delta\omega$ is a current rotational speed, and h is the amplitude value of the generator output power.

The mechanical energy-releasing electrical power-generating curve is specifically expressed as follows:

$P=(a_n*\omega^n+a_{n-1}*\omega^{n-1}+ \ldots a_1*\omega+a_0)+h$, where $a_n$ is a constant, $n \geq 1$, $\omega$ is the rotational speed of the wind turbine, h is the amplitude value of the generator output power, and P is a value of the generator output power.

In FIG. 2, a straight line AD is determined by a maximum power point of a wind turbine characteristic, that is, an intersection of the straight line AD and a wind turbine characteristic curve is the maximum power point of the wind turbine characteristic, the rotational speed of the wind turbine corresponding to the line is set to $\omega_0$, and the line is a baseline.

A distance between a line segment BC and a line segment DA is set to $\Delta\omega$, which is a variable, and its value is selected according to a simulation test.

The height h of a curve CD and parameters of the curve (for example, the curve may select a quadratic curve section represented by the parameters) are determined based on researches, the value of h decides the amplitude of energy to be released, and the shape of the curve decides the trends of the energy to be released. Based on the researches, if the curve drops from a point C to a point D, the effect is better, which represents that a higher power is outputted close to the high rotational speed point C and a relatively low power is outputted close to the low rotational speed point D, thereby improving the efficiency and also avoiding overshoot (that is, an operating point reaches the left side over the point D, which is no benefit).

The section parameter of the preset dynamic matching wind speed specifically includes a section of the wind speed in a value range of 3 m/s to 8 m/s. When the wind speed is over the value range of 3 m/s to 8 m/s, the optimal matching efficiency in the present invention cannot be achieved.

The medium and low wind speeds specifically include 4 m/s, 5 m/s, 6 m/s, 7 m/s and wind speed less than 7 m/s and 8 m/s.

Step 102: perform real-time wind speed measurement to obtain a real-time wind speed;

Step 103: determine the value relationship between the real-time wind speed and the preset dynamic matching wind speed to obtain a determining result;

Step 104: if the determining result represents that the real-time wind speed is lower than the preset dynamic matching wind speed, perform real-time wind speed measurement again;

Step 105: if the determining result represents that the real-time wind speed is beyond an MPPT operating section, operate with constant power output, change a blade pitch angle of the wind turbine, and perform real-time wind speed measurement again;

specifically, the changing a blade pitch angle of the wind turbine is: increase the blade pitch angle to a second threshold when the real-time wind speed is increased relative to a preset wind speed, and reduce the blade pitch angle to a third threshold when the real-time wind speed is reduced relative to the preset wind speed.

Where the value of the preset wind speed is 14 m/s.

Step 106: if the determining result represents that the real-time wind speed is greater than the preset dynamic matching wind speed but is still within the MPPT operating section, set the increment of the rotational speed of the wind turbine to zero;

Step 107: acquire a nominal wind speed which is acquired from the controller and has a first threshold difference from the real-time wind speed, and read dynamic matching parameters at the nominal wind speed from the controller;

Step 108: achieve a mechanical energy-accumulating speed-increasing state, which is represented by a straight line segment AB in FIG. 2, of the wind turbine according to the dynamic matching parameters at the nominal wind speed;

Step 109: convert to a mechanical energy-releasing electrical power-generating state, which is represented by a segment CD in FIG. 2, after the rotational speed of the wind turbine is increased to be the sum of the rotational speed of the wind turbine with the maximum wind energy capture and the increment of the rotational speed of the wind turbine; and A segment AB and the segment CD form an end-to-end circulation continuously operating so as to achieve that a wind power generator operates simultaneously at a relatively high rotational speed and in a relatively high efficiency section, achieve the increase of power generation output, and then achieve the objective of improving the overall power generation efficiency.

Step 110: when the rotational speed of the wind turbine is reduced to the rotational speed of the wind turbine with maximum wind energy capture, complete dynamic matching, perform the real-time wind speed measurement again to perform the next dynamic matching.

Figure 3:
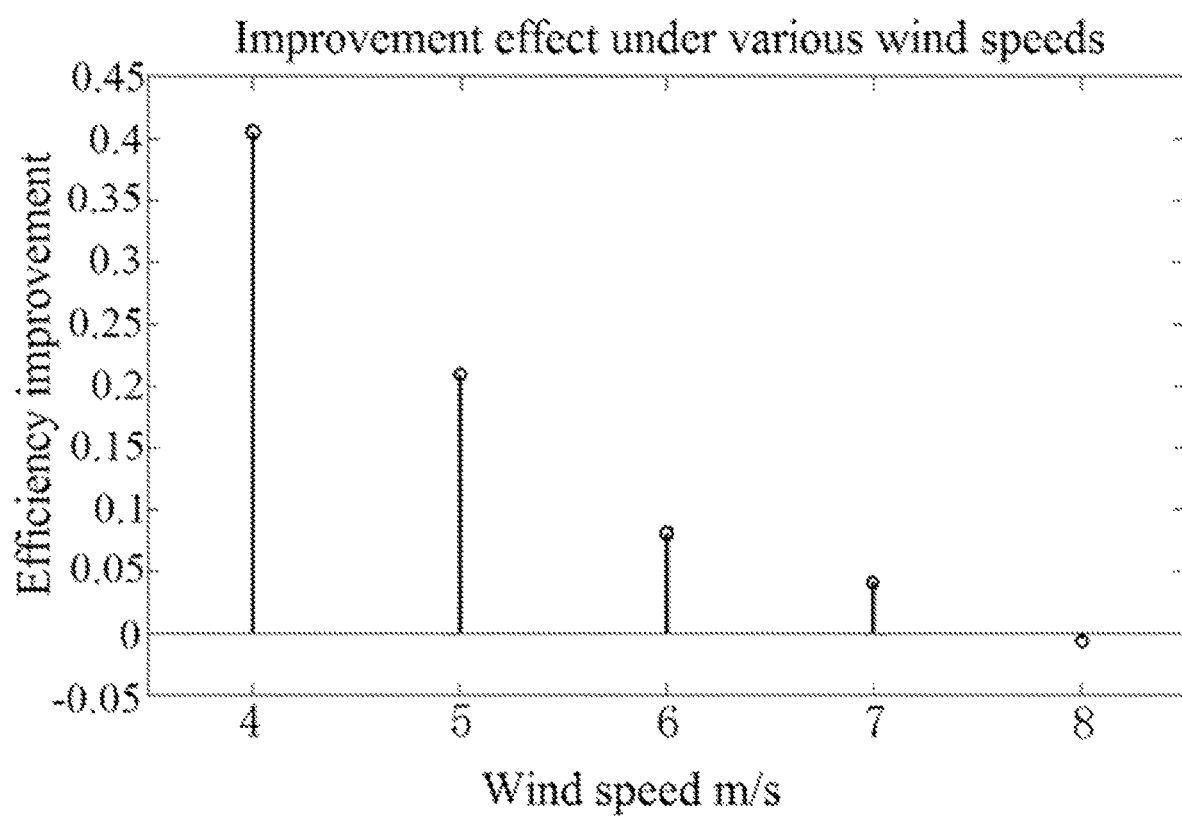
FIG. 3 is a diagram of improvement effects, obtained by simulation, under the new MPPT when the wind speed is in a value range of 4 m/s to 8 m/s according to an embodiment of the present invention.

FIG. 3 is a diagram of improvement effects, obtained by simulation, under the new MPPT when the wind speed is in a value range of 4 m/s to 8 m/s according to an embodiment of the present invention. As shown in FIG. 3, an improvement effect under various wind speeds is obtained by simulation under the new MPPT by aiming at each wind speed in the value range of 4 m/s to 8 m/s, and it can be seen that the new MPPT is suitable for the fact that the wind speed is lower than 8 m/s, and different improvement effects can be obtained; and the lower the wind speed is, the higher the improvement degree is. The improvement effect of 40% can be obtained at the wind speed of 4 m/s.

Figure 4:
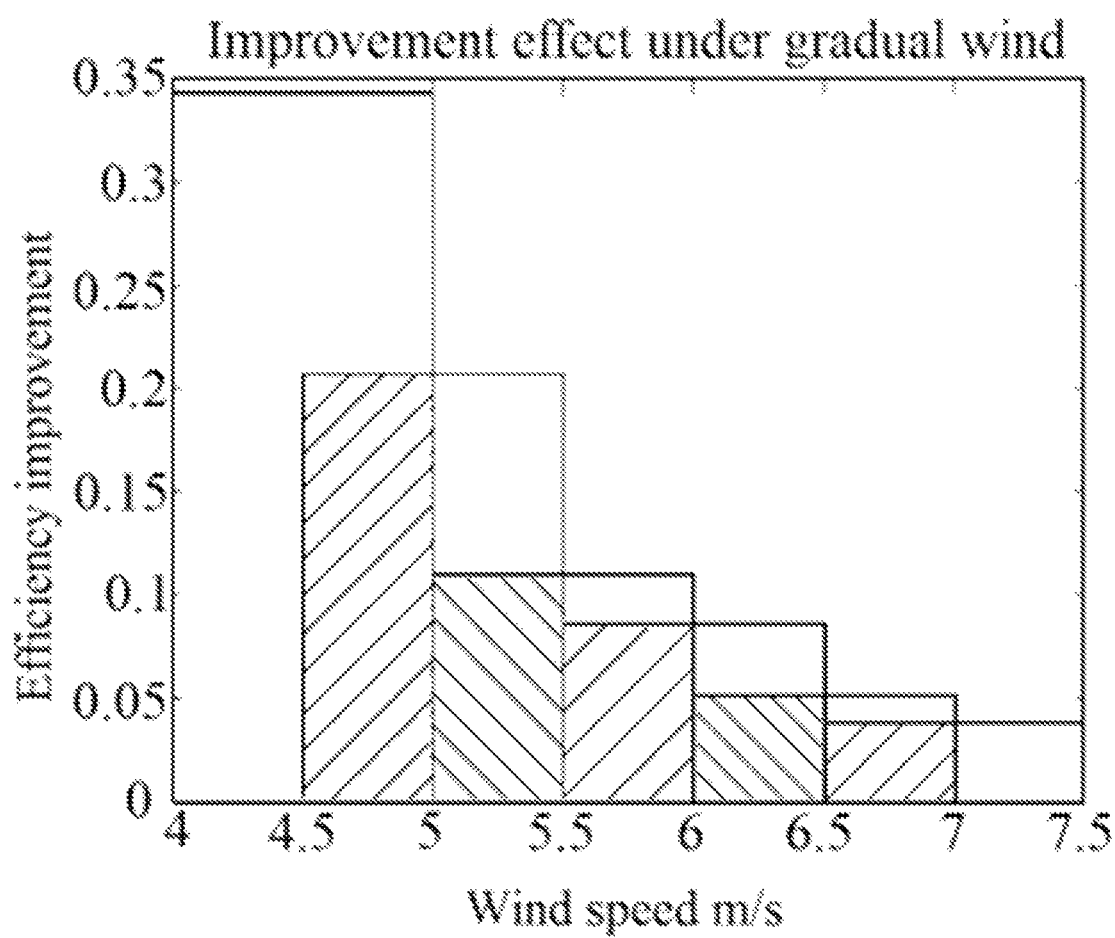
FIG. 4 is a diagram of improvement effects obtained when an improved value at each wind speed is simulated by aiming at a gradual wind situation according to an embodiment of the present invention.

FIG. 4 is a diagram of improvement effects obtained when an improved value at each wind speed is simulated by aiming at a gradual wind situation according to an embodiment of the present invention. As shown in FIG. 4, simulation working conditions and parameter selection are described as follows: in a first simulation, the wind speed is steadily increased from 4 m/s to 5 m/s within 200 s, a new MPPT parameter selects a parameter at the wind speed of 5 m/s, and an improvement effect is shown in a relative position in the drawing; in a second simulation, the wind speed is steadily increased from 4.5 m/s to 5.5 m/s within 200 s, a new MPPT parameter selects a parameter at the wind speed of 5 m/s, and an improvement effect is shown in a relative position in the drawing; and the rest is performed by that analogy. Therefore, an improve under gradual wind is similar to the improvement effect at each wind speed, each simulation result at the wind speed between 4 m/s and 7.5 m/s is improved, the improvement effect at the wind speed close to 4 m/s is the most remarkable, the improvement effect at the wind speed close to 7.5 m/s is relatively low, and the improvement effects at the wind speeds from 4 m/s to 7.5 m/s show a gradual trend.

Figure 5:
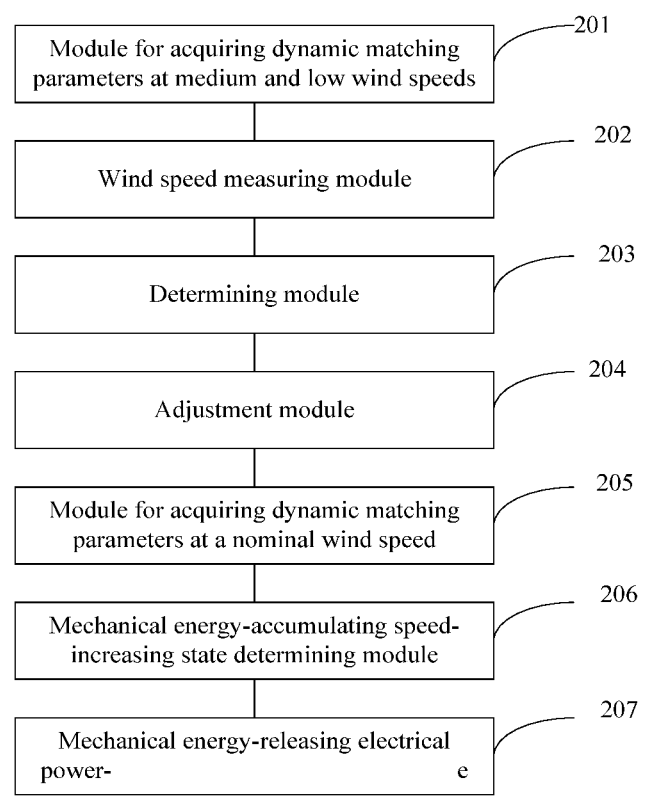
FIG. 5 is a schematic structural diagram of a dynamic matching system for improving wind power generation efficiency at medium and low wind speeds according to an embodiment of the present invention.

As shown in FIG. 5, FIG. 5 is a schematic structural diagram of a dynamic matching system for improving wind power generation efficiency at medium and low wind speeds according to an embodiment of the present invention, where the system includes:

a module for acquiring dynamic matching parameters at medium and low wind speeds 201, which is used for acquiring dynamic matching parameters at medium and low wind speeds and storing the dynamic matching parameters at the medium and low wind speeds in a controller of a wind power generation system, where the dynamic matching parameters at the medium and low wind speeds include a rotational speed of a wind turbine with a maximum wind energy capture, an increment of the rotational speed of the wind turbine, an amplitude value of a generator output power, a curve parameter of a mechanical energy-releasing electrical power-generating curve, and a section parameter of a preset dynamic matching wind speed;

a wind speed measuring module 202, which is used for performing real-time wind speed measurement to obtain a real-time wind speed;

a determining module 203, which is connected to the wind speed measuring module and is used for determining the value relationship between the real-time wind speed and the preset dynamic matching wind speed to obtain a determining result; where the wind speed measuring module is further used for performing real-time wind speed measurement again if the determining result represents that the real-time wind speed is lower than the preset dynamic matching wind speed;

an adjustment module 204, which is connected to the determining module and the wind speed measuring module and is used for: if the determining result represents that the real-time wind speed is beyond an MPPT operating section, operating with constant power output and changing a blade pitch angle of the wind turbine; and if the determining result represents that the real-time wind speed is greater than the preset dynamic matching wind speed but is still within the MPPT operating section, setting the increment of the rotational speed of the wind turbine to zero; where the wind speed measuring module is further used for performing real-time wind speed measurement again after the adjustment module changes the blade pitch angle of the wind turbine;

a module 205 for acquiring dynamic matching parameters at a nominal wind speed, which is connected to the adjustment module and is used for acquiring a nominal wind speed which is acquired from the controller and has a first threshold difference from the real-time wind speed, and reading dynamic matching parameters at the nominal wind speed from the controller;

a mechanical energy-accumulating speed-increasing state determining module 206, which is used for determining a mechanical energy-accumulating speed-increasing state of the wind turbine according to the dynamic matching parameters at the nominal wind speed; and a mechanical energy-releasing electrical power-generating state converting module 207, which is connected to the wind speed measuring module and is used for converting to a mechanical energy-releasing electrical power-generating state till the dynamic matching is completed after the rotational speed of the wind turbine is increased to be the sum of the rotational speed of the wind turbine with the maximum wind energy capture and the increment of the rotational speed of the wind turbine; where the wind speed measuring module is further used for performing real-time wind speed measurement again after the dynamic matching is completed, and the dynamic matching is completed when the rotation speed of the wind turbine is reduced to the rotational speed of the wind turbine with maximum wind energy capture.

Additionally, the method of the present invention is not only applicable to a Doubly Fed Induction Generator (DFIG) wind power generation system, but also applicable to a Permanent Magnetic Synchronous Generator (PMSG) wind power generation system.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A dynamic matching method for improving wind power generation efficiency at medium and low wind speeds, wherein the method comprises:

acquiring dynamic matching parameters at medium and low wind speeds, and storing the dynamic matching parameters at the medium and low wind speeds in a controller of a wind power generation system, wherein the dynamic matching parameters at the medium and low wind speeds comprise a rotational speed of a wind turbine with a maximum wind energy capture, an increment of the rotational speed of the wind turbine, an amplitude value of a generator output power, a curve parameter of a mechanical energy-releasing electrical power-generating curve, and a section parameter of a preset dynamic matching wind speed;

performing real-time wind speed measurement to obtain a real-time wind speed;

determining the value relationship between the real-time wind speed and the preset dynamic matching wind speed to obtain a determining result;

if the determining result represents that the real-time wind speed is lower than the preset dynamic matching wind speed, delaying a fixed time interval, and performing real-time wind speed measurement again;

if the determining result represents that the real-time wind speed is beyond a maximum power point tracking ("MPPT") operating section, operating with constant power output, changing a blade pitch angle of the wind turbine, delaying the fixed time interval, and performing real-time wind speed measurement again;

if the determining result represents that the real-time wind speed is greater than the preset dynamic matching wind speed but is still within the MPPT operating section, setting the increment of the rotational speed of the wind turbine to zero;

acquiring a nominal wind speed which is acquired from the controller and has a first threshold difference from the real-time wind speed, and reading dynamic matching parameters at the nominal wind speed from the controller;

achieving a mechanical energy-accumulating speed-increasing state of the wind turbine according to the dynamic matching parameters at the nominal wind speed;

converting to a mechanical energy-releasing electrical power-generating state after the rotational speed of the wind turbine is increased to be the sum of the rotational speed of the wind turbine with the maximum wind energy capture and the increment of the rotational speed of the wind turbine; and when the rotational speed of the wind turbine is reduced to the rotational speed of the wind turbine with maximum wind energy capture, completing the current dynamic matching procedure, performing real-time wind speed measurement again to perform the next dynamic matching.

2. The dynamic matching method for improving wind power generation efficiency at medium and low wind speeds according to claim 1, wherein the section parameter of the preset dynamic matching wind speed specifically comprises a section of the wind speed in a value range of 3 m/s to 8 m/s.

3. The dynamic matching method for improving wind power generation efficiency at medium and low wind speeds according to claim 1, wherein the changing a blade pitch angle of the wind turbine specifically is: increasing the blade pitch angle to a second threshold when the real-time wind speed is increased relative to a preset wind speed, and reducing the blade pitch angle to a third threshold when the real-time wind speed is reduced relative to the preset wind speed.

4. The dynamic matching method for improving wind power generation efficiency at medium and low wind speeds according to claim 3, wherein the value of the preset wind speed is 14 m/s.

5. The dynamic matching method for improving wind power generation efficiency at medium and low wind speeds according to claim 1, wherein the medium and low wind speeds specifically comprise 3 m/s, 4 m/s, 5 m/s, 6 m/s, 7 m/s and wind speed less than 8 m/s.

6. The dynamic matching method for improving wind power generation efficiency at medium and low wind speeds according to claim 1, wherein the mechanical energy-releasing electrical power-generating curve is specifically represented as follows:

$$P=(a_n*\omega^n+a_{n-1}*\omega^{n-1}++ \ldots a_1*\omega+a_0)+h,$$

wherein $a_n$ is a constant, $n \geq 1$, $\omega$ is the rotational speed of the wind turbine, h is the amplitude value of the generator output power, and P is a value of the generator output power.

7. A dynamic matching system for improving wind power generation efficiency at medium and low wind speeds, wherein the system comprises:

a module for acquiring dynamic matching parameters at medium and low wind speeds, which is used for acquiring dynamic matching parameters at medium and low wind speeds and storing the dynamic matching parameters at the medium and low wind speeds in a controller of a wind power generation system, wherein the dynamic matching parameters at the medium and low wind speeds comprise a rotational speed of the wind turbine with a maximum wind energy capture, an increment of the rotational speed of the wind turbine, an amplitude value of a generator output power, a curve parameter of a mechanical energy-releasing electrical power-generating curve, and a section parameter of a preset dynamic matching wind speed;

a wind speed measuring module, which is used for performing real-time wind speed measurement to obtain a real-time wind speed;

a determining module, which is connected to the wind speed measuring module and is used for determining the value relationship between the real-time wind speed and the preset dynamic matching wind speed to obtain a determining result; wherein the wind speed measuring module is further used for performing real-time wind speed measurement again if the determining result represents that the real-time wind speed is lower than the preset dynamic matching wind speed;

an adjustment module, which is connected to the determining module and the wind speed measuring module and is used for: if the determining result represents that the real-time wind speed is beyond a maximum power point tracking ("MPPT") operating section, operating with constant power output and changing a blade pitch angle of the wind turbine; and if the determining result represents that the real-time wind speed is greater than the preset dynamic matching wind speed but is still within the MPPT operating section, setting the increment of the rotational speed of the wind turbine to zero; wherein the wind speed measuring module is further used for performing real-time wind speed measurement again after the adjustment module changes the blade pitch angle of the wind turbine;

a module for acquiring dynamic matching parameters at a nominal wind speed, which is connected to the adjustment module and is used for acquiring a nominal wind speed which is acquired from the controller and has a first threshold difference from the real-time wind speed, and reading dynamic matching parameters at the nominal wind speed from the controller;

a mechanical energy-accumulating speed-increasing state determining module, which is used for determining a mechanical energy-accumulating speed-increasing state of the wind turbine according to the dynamic matching parameters at the nominal wind speed; and a mechanical energy-releasing electrical power-generating state converting module, which is connected to the wind speed measuring module and is used for converting to a mechanical energy-releasing electrical power-generating state till the dynamic matching is completed after the rotational speed of the wind turbine is increased to be the sum of the rotational speed of the wind turbine with the maximum wind energy capture and the increment of the rotational speed of the wind turbine; wherein the wind speed measuring module is further used for performing real-time wind speed measurement again after the dynamic matching is completed, and the dynamic matching is completed when the rotation speed of the wind turbine is reduced to the rotational speed of the wind turbine with maximum wind energy capture.

* * * * *